United States Patent [19]

Hirata et al.

[11] Patent Number: 5,204,601

[45] Date of Patent: Apr. 20, 1993

[54] MOTOR CONTROL SERVO SYSTEM

[75] Inventors: Masafumi Hirata; Hiroshi Shimaya, both of Tokyo, Japan

[73] Assignee: Fuji Photo Film Co., Ltd., Kanagawa, Japan

[21] Appl. No.: 619,463

[22] Filed: Nov. 29, 1990

[30] Foreign Application Priority Data

Dec. 1, 1989 [JP] Japan .................................. 1-310677
Dec. 1, 1989 [JP] Japan .................................. 1-310678

[51] Int. Cl.[5] ............................................ G05B 13/00
[52] U.S. Cl. .................................... 318/606; 318/608; 318/685; 388/812
[58] Field of Search ............... 318/606, 607, 608, 571, 318/603, 683, 685; 388/812, 915; 358/337, 342, 906; 360/73.03

[56] References Cited

U.S. PATENT DOCUMENTS

| | | | |
|---|---|---|---|
| 4,543,516 | 9/1985 | Kobori et al. | 318/318 |
| 4,564,795 | 1/1986 | Parkes et al. | 318/314 |
| 4,658,191 | 4/1987 | Okita et al. | 318/608 X |
| 4,803,568 | 2/1989 | Miyake | 318/606 X |
| 4,902,949 | 2/1990 | Hirata | 318/608 |
| 4,999,714 | 3/1991 | Vogel | 358/337 |
| 5,010,287 | 4/1991 | Mukai et al. | 318/801 |

Primary Examiner—William M. Shoop, Jr.
Assistant Examiner—Brian Sircus

[57] ABSTRACT

A motor speed controller implements a speed control to phase control switch over. When the switch over occurs on initial offset between the reference speed signal phase and the current motor position phase is determined. The reference speed signal is then offset by this phase difference thereby achieving a quicker servo lock.

6 Claims, 8 Drawing Sheets

MOTOR CONTROL SERVO SYSTEM

FIELD OF THE INVENTION

This invention relates to a motor control servo system including a speed control servo system, and more particularly to a motor control servo system in which, when a motor attains a speed level falling within a predetermined speed range, the phase difference between the output of the motor and a reference signal is measured and computed so as to carry out phase control by setting a reference or target phase of a phase system on the basis of the computed phase difference.

BACKGROUND OF THE INVENTION

A recording medium such as a magnetic tape in a VTR or a video floppy disk used for recording a video signal is rotated by a motor relative to a video head. For the purpose of motor phase control, a vertical synchronizing signal contained in the video signal is used as a reference signal phase which is compared in a phase system with a comparative signal phase provided by a phase generator (PG) signal indicative of the phase of one complete rotation of the motor.

On the other hand, in the case of motor phase control in an electronic still camera, quick start-up is demanded for a motor in view of the specific function of the camera. However, the motor phase control based on the phase comparison between the vertical synchronizing signal and the PG signal cannot satisfy the demand. This is because, when the NTSC signal having the field frequency of 60 Hz is used for the phase comparison, a period of time as long as several seconds is required until phase pull-in is completed.

Therefore, it has been a prior art practice that a high-speed signal generated from the synchronizing signal generator (SSG) is the image pickup system of the electronic still camera is used as a reference phase, while the FG signal indicative of the rotation speed of the motor is used as a comparative signal phase. Further, these signal phases are compared at the frequency higher than that of the PG signal, thereby completing the phase pull-in within a short period of time.

However, in the case of the above manner of phase control, the phase of the vertical synchronizing signal does not match that of the PG signal. That is, the mechanical position of the recording medium and the position of the vertical synchronizing signal on the magnetic pattern do have not a predetermined relation between them.

Therefore, it is now a common practice that, after the motor is servo locked, only the PG signal indicative of one complete rotation of the motor as well as the rotation phase of the magnetic sheet is used to reset the video synchronizing signal from the SSG, and the phase difference between the PG signal and the leading edge of the vertical synchronizing signal is set at 7H (H: one horizontal scanning period).

By the above manner of phase control, the phase pull-in is completed within several hundred milliseconds. Therefore, the period of the time required for the electronic still camera for recording an object could be shortened, and the possibility of losing the shutter chance by quick depression of the release switch of the camera could be minimized.

However, the factor which actually limits the length of time required until video recording is enable in the electronic still camera system is the period of time elapsed until the PG signal and the vertical synchronizing signal are stably and positively synchronized. Because the period of time required until the motor is placed in its servo locked condition occupies the greater part of the above period of time, it is further demanded to place the motor in the servo locked condition as quick as possible without any fluctuation in the period of time.

Among a plurality of methods for deciding the servo locked condition of the motor which provides the basis for resetting the SSG, there are the following two typical methods:

1. The method in which the phase error voltage is continuously detected so as to decide that the motor is servo locked as soon as the phase error attains a level within a predetermined range.

2. The method in which the decision for the servo locked condition of the motor is not especially made, and the motor is presumed to be servo locked when a certain predetermined period of time has elapsed after the motor is started.

However, although the first method can positively decide that the motor is completely servo locked, the first method has such an essential disadvantage that the period of time elapsed, until the motor is servo locked, tends to fluctuate. This tendency adversely effects the decision.

On the other hand, in the case of the second method, the period of time elapsed until the motor is decided to be servo locked is freed from fluctuation. However, in the second method, it is necessary to take into consideration various kinds of other sources of fluctuation encountered until the motor is actually servo locked, and it is also necessary to take into consideration a margin for compensation of the fact that the servo locked condition of the motor is not directly detected. In view of the above necessity, the second method has such a disadvantage that a considerably long period of time must be prepared before the SSG is reset.

Thus, each of the first and second methods can satisfactorily work when the fluctuation of the period of time required until the motor is servo locked is made uniform, and the phase is pulled in within a short period of time.

In order that the phase pull-in can be achieved within a short period of time, it is generally necessary to widen the operation bandwidth of the phase system in the servo system, that is, to widen the f (frequency) characteristic of the servo system.

However, when the f characteristic of the servo system is widened, the servo system may respond to internal noise, disturbance, etc. Therefore, the f characteristic of the servo system cannot be excessively widened. Especially, when the f characteristic is set so as not to respond to an "encoder FG error" which appears once for every one complete rotation of the motor, the step response time is determined by such an f characteristic, so that the period of time required until the motor is servo locked cannot be shortened beyond a certain limit. Thus, there is such a disadvantage that maximum fluctuation may occur finally in the period of time required until the motor is servo locked.

SUMMARY OF THE INVENTION

It is a first object of the present invention to provide a motor control servo system which quickly responds to a speed command at the time of, for example, starting a motor or changing a reference speed of the motor, so that the motor can be stably servo locked within a short period of time without fluctuation of the period of time required until the motor is servo locked.

It is a second object of the present invention to provide a motor control servo system which quickly responds to a speed command at the time of, for example, starting a motor, or changing reference speed of the motor even when the servo system is controlled by a microprocessor using software, so that the motor can be servo locked within a short period of time without fluctuation of the period of time required until the motor is servo locked. Thus, the motor can operate with a satisfactory base characteristic in its steady state.

The motor control servo system which attains the first object comprises a first control loop control means, for controlling the speed of a motor, a second major loop, or control device, disposed outside the first phase control loop, for controlling phase of the motor, including means for detecting the difference between a generated reference phase and a motor rotation output phase, means for phase shifting the generated reference phase based upon the detected phase difference, the output of this phase shifting means being applied to the first control loop as a second input reference phase, and switch means disposed in a feedback path of the second control means for determining phase shift amount by the phase shifting means when the rotation speed of the motor reaches a speed level within a predetermined range of a steady speed level from a non-steady speed level.

The motor control servo system which attains the second object comprises reference rotation speed generating means for generating a target or reference rotation speed of a motor, rotation speed error detecting means for detecting a speed error between the target or reference rotation speed and the actual rotation speed of the motor, reference rotation phase generating means for generating a target or reference rotation phase of the motor, rotation phase error detecting means for detecting a phase error between the target or reference rotation phase and the actual rotation phase of the motor, steady speed detecting means for detecting that the actual motor rotation speed has reached a level within a predetermined range of the target or reference rotation speed, memory means for storing the phase error between the target or reference rotation phase and the actual motor rotation phase as data, phase phase shifting means for shifting the output of the reference rotation phase generating means according to the data stored in the memory means, and means for setting the stored data of the memory means in the phase shifting means when the steady speed detecting means detects that the actual motor rotation speed has reached a level within a predetermined range of the reference rotation speed.

DETAILED DESCRIPTION OF THE PREFERRED EMBODIMENTS

Preferred embodiments of the present invention will now be described in detail with reference to FIGS. 1 to 16.

Figure 2:
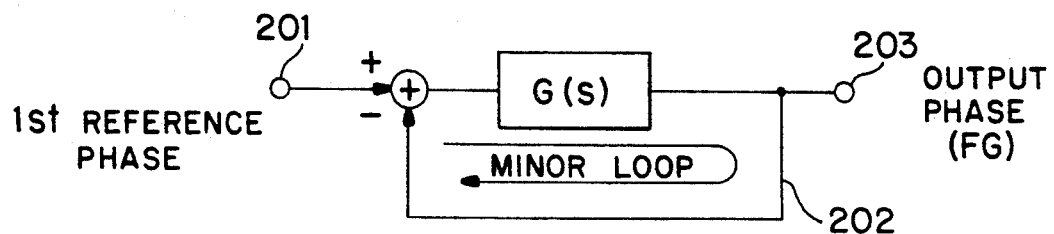
FIGS. 2, 3 and 4 illustrate the basis principle of the present invention.
Figure 3:
Figure 4:
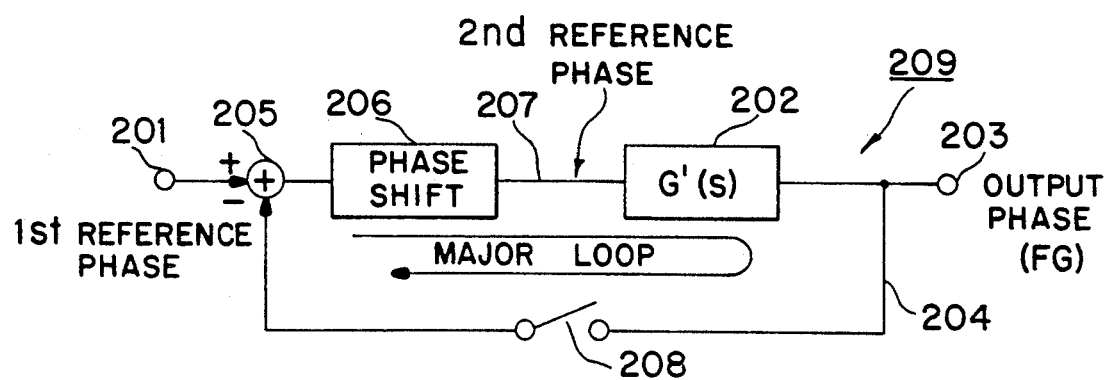

FIGS. 2, 3 and 4 illustrate the fundamental concept of a basic embodiment of the present invention. FIG. 2 shows a minor loop or device or a first phase control loop 202 which has a transfer function G (S). A reference pulse signal is applied as a first phase input reference phase 201 to the first control loop 202, and an motor-rotation FG signal is generated as an output phase 203 from the first phase control loop 202. FIG. 3 is an equivalent circuit of FIG. 2, and it will be seen that the equivalent circuit of the first control loop 202 has a transfer function $G'(S)=G(S)/[1+G(S)]$. FIG. 4 shows an entire phase control loop. Referring to FIG. 4, a second major loop 204 is provided outside the first phase control loop 202, and an adder circuit 205 detects the phase difference between the first input reference phase 201 and the motor-rotation FG signal 203. A phase shift circuit 206 is interposed between the adder circuit 205 and the first phase control loop 202 so as to shift the phase of the first input reference phase 201 according to the detected phase difference thereby generating a second input reference phase 207. This second input reference phase 207 is applied as a new reference phase to the first phase control loop 202. The amount of phase shift by the phase shift circuit 206 is set only as soon as the steady speed of the motor is nearly reached. A switch 208 is inserted in a feedback path of the second major loop or phase control device 204. This switch 208 is turned on when the motor rotates at a non-steady speed but is turned off when the motor rotates in its steady speed range.

In the motor control servo system of the present invention, the second input reference phase 207 is set, so that the first input reference phase 201, which is the target of the motor phase system, can coincide with the motor rotation output phase when the speed system reaches a speed level close to the steady speed, and the phase system starts to attain the phase pull-in. Therefore, because the target setting of the first phase control loop 202, which is the minor loop, is maintained constant, and its value is small in itself, the period of time required for the phase pull-in can be shortened and can also be stabilized without fluctuating each time the motor is started.

In the case of the basic embodiment described with reference to FIGS. 2 to 4, the following problem arises when processing by a microprocessor or a microcomputer is applied to the motor control servo system, so that the period of time required for servo locking the motor after setting the second reference phase 207 on the basis of the first reference phase 201 can be shortened. Further, motor can be servo locked without fluctuation of the required period of time.

That is, when the motor control servo system is composed of analog and logic hardware parts, the phase system can generate an output proportional to the phase difference between the reference phase pulse signal and the comparative phase pulse signal. This is because, even when these pulse signals are almost simultaneously applied, they are processed in parallel.

However, in the case of processing by a microprocessor or microcomputer, the microprocessor or microcomputer can basically execute series processing only, although parallel processing may be realized depending on the method for computation or the architecture of the microprocessor or microcomputer system itself. Thus, when the phase difference is close to zero, one of the pulse signals cannot be processed, with the result that the zero phase difference cannot be accurately detected, or a long period of time is required until appearance of the output. This difficulty gives rise to occurrence of a dead zone or a delay time in the servo characteristic, resulting in degraded performance of the servo system.

Especially, this adverse effect tends to appear in the steady operating state of the motor, because, in the servo locked condition of the motor, the phase difference makes a fine variation around the zero value.

An embodiment of the motor control servo system suitable for control by processing by, for example, a microprocessor using software will now be described with in detail reference to FIG. 1 and FIGS. 5 to 16.

Figure 1:
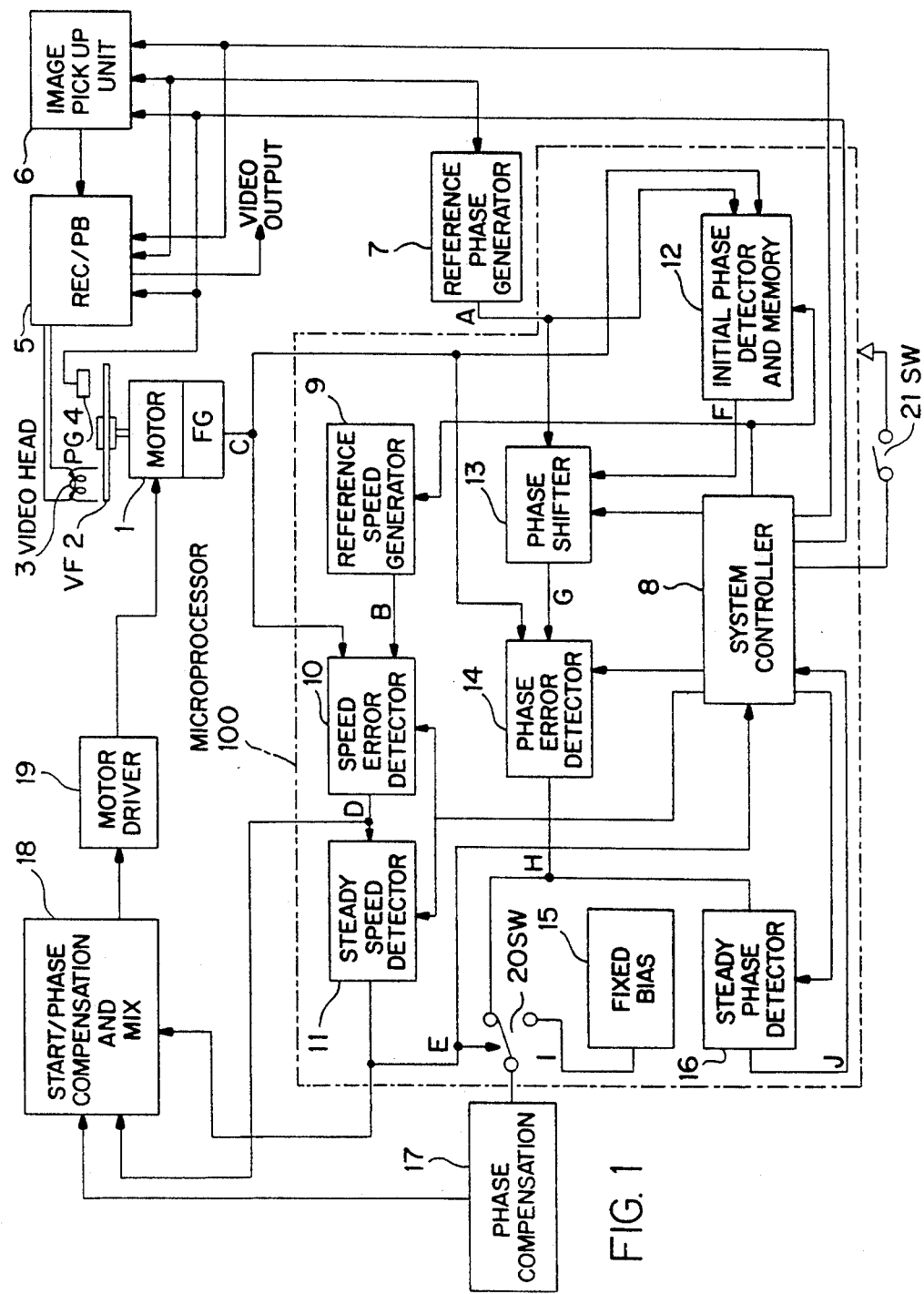
FIG. 1 is a block diagram showing the structure of an embodiment of the motor control servo system of the present invention when applied to an electronic still camera.

FIG. 1 shows application of the embodiment of the present invention to an electronic still camera.

Referring to FIG. 1, a magnetic disk (VF) 2 is rotated by a motor 1 by being firmly chucked to the spindle of the motor 1. In the record mode, an image signal picked up by an image pickup unit 6 is processed by a signal recording/reproducing circuit 5, and a recording current is supplied from the signal recording/reproducing circuit 5 to a video head 3 thereby recording the image signal on the magnetic disk 2. In the playback mode, the image signal recorded on the magnetic disk 2 rotated by the motor 1 is reproduced by the video head 3 and then processed by the recording/reproducing circuit 5 to appear as a video signal output. A phase generator (PG) 4 is associated with the disk 2.

A clock signal from a synchronizing signal generator (SSG) incorporated in the image pickup unit 6 is applied to a reference phase generating circuit 7. The reference phase generating circuit 7 divides the frequency of the clock input thereby generating a first reference phase signal A.

A system control circuit 8 controls the recording/reproducing circuit 5 and the image pickup unit 6. The system control circuit 8 also controls a reference speed generating circuit 9, a rotation speed error detection circuit 10, a steady speed detection circuit 11, an initial phase detection/memory circuit 12, a reference phase shift circuit 13, a rotation phase error detection circuit 14 and a steady phase detection circuit 16.

The reference speed generating circuit 9 instructs the normal rotation speed of the motor 1 and applies its output signal B to the rotation speed error detection circuit 10.

In response to the application of a rotation speed signal C generated from a frequency generator (FG) associated with the motor 1, together with the output signal B of the reference speed generating circuit 9, the rotation speed error detection circuit 10 generates a speed error signal D relative to the normal rotation speed of the motor 1.

In response to the application of the speed error signal D from the rotation speed error detection circuit 10, the steady speed detection circuit 11 decides as to whether or not the present rotation speed of the motor 1 is close to, or within a predetermined range of, the steady (normal) speed, and applies its decision output signal E to both the system control circuit 8 and a switch 20.

The initial phase detection/memory circuit 12 detects the phase difference between the first reference phase signal A from the reference phase generating circuit 7 and the rotation speed signal C from the FG of the motor 1 and stores the detected phase difference in its memory. The phase difference output signal F from the memory of the circuit 12 is applied to the reference phase shift circuit 13.

The phase of the first reference signal A from the reference phase generating circuit 7 is shifted by the reference phase shift circuit 13 according to the phase difference output signal F from the circuit 12. Further, circuit 13 generates an output signal G as a result of the phase shift. This output signal G is applied as a second reference phase signal to the rotation phase error detection circuit 14.

The rotation phase error detection circuit 14 detects the phase difference between the motor rotation speed signal C and the second reference phase signal G, and the detected phase difference is generated as a phase error signal H.

In response to the application of the phase error signal H, the steady phase detection circuit 16 detects whether or not the motor 1 is rotating in the steady phase range, and its output signal J indicative of the result of decision is applied to the system control circuit 8.

A fixed bias signal I from a fixed bias circuit 15 is applied together with the phase error signal H to the switch 20. When the decision output signal E from the steady speed detection circuit 11 indicates that the motor 1 is rotating in its steady speed range, the switch 20 selects the phase error signal H. Further, when the decision output signal E indicates that the motor 1 is rotating outside its steady speed range, the switch 20 selects the fixed bias signal I. The signal H or I selected by the switch 20 is applied to a phase compensation circuit 17.

The phase compensation circuit 17 acts as a phase compensation filter and applies its output signal to a start-up compensation/phase compensation/mixer circuit 18. The circuit 18 processes the speed error signal D from the rotation speed error detection circuit 10 and the output signal from the phase compensation circuit 17 and applies its resultant output signal to a motor driver circuit 19. In response to the application of the output signal from the circuit 18, the motor driver circuit 19 supplies current to the motor 1 thereby driving the motor 1.

In FIG. 1, a microprocessor 100 carries out the functions of the circuits 8, 9, 10, 11, 12, 13, 14, 15 and 16 enclosed by the one-dot chain lines in FIG. 1.

Figure 5:
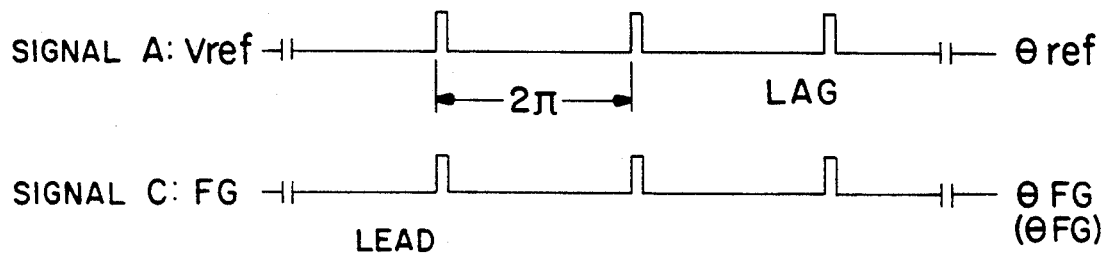
FIGS. 5, 7, 8, 11 and 13 are timing charts of the operation of the servo system of the present invention.
Figure 6:
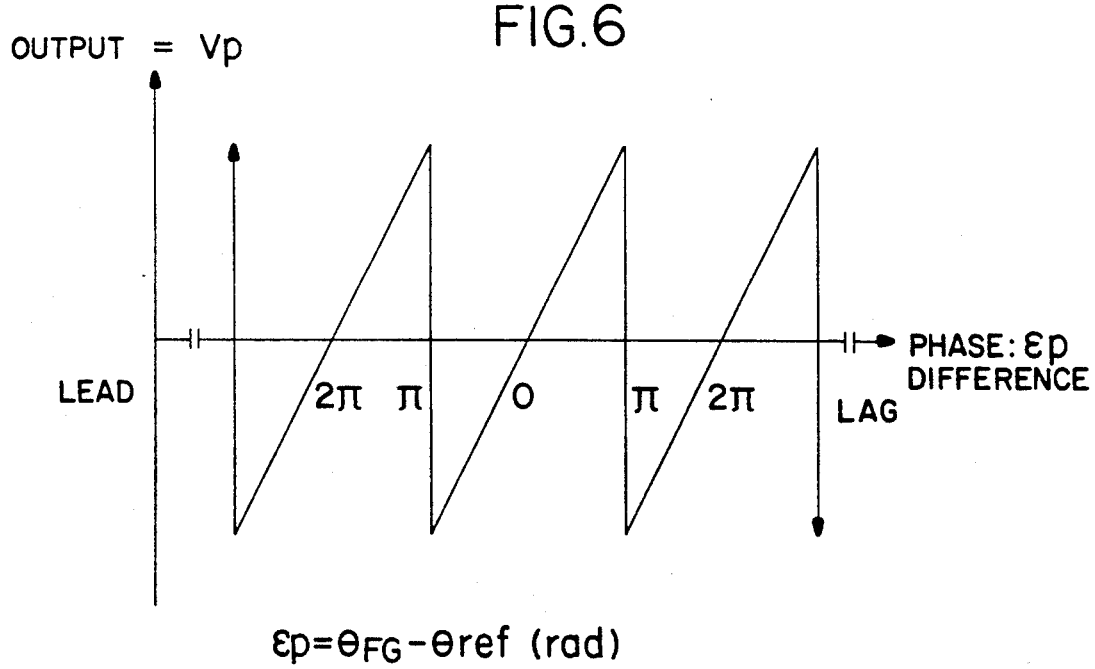
FIGS. 6 and 12 show the phase comparison characteristics according to the present invention.

FIGS. 5 and 6 show the operation timing chart and the phase comparison characteristic respectively of the rotation phase error detection circuit 14 described above.

Figure 7:
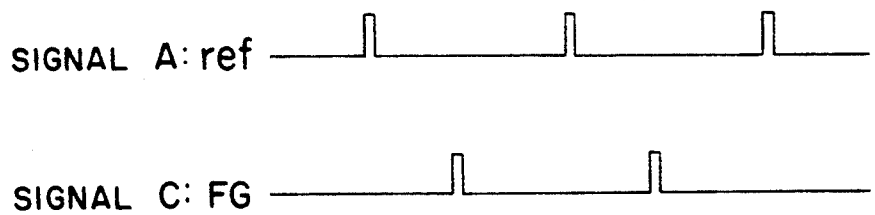
Figure 8:
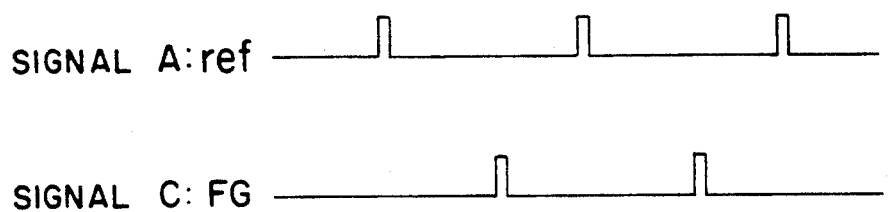
Figure 9:
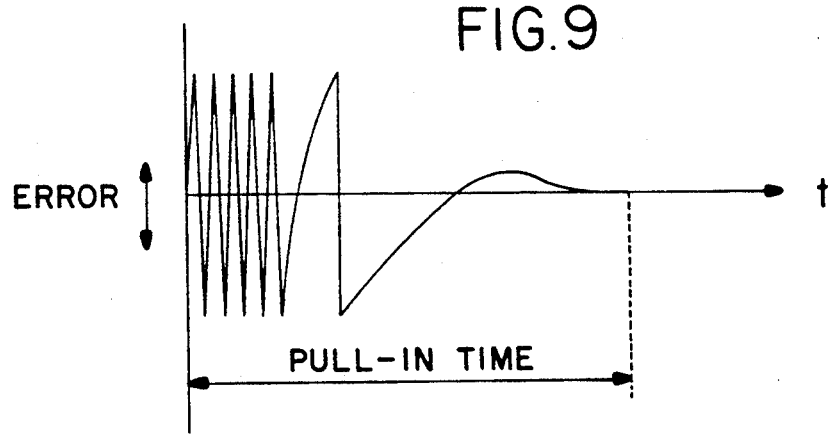
FIGS. 9 and 10 show waveforms of phase error signals.
Figure 10:
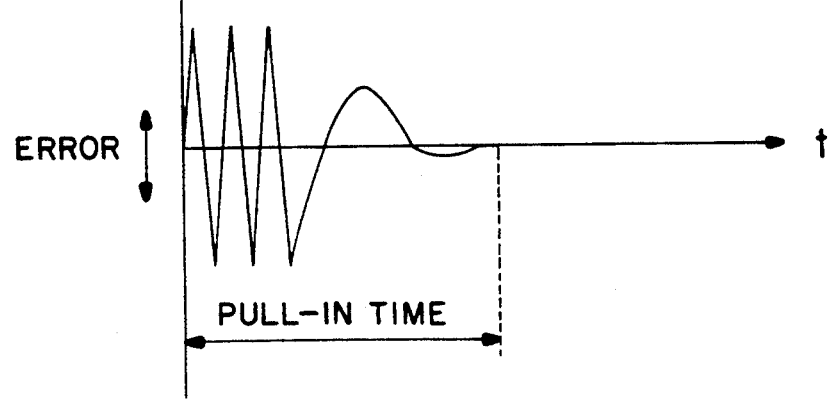

The first reference phase signal A is applied to the initial phase detection/memory circuit 12 and the reference phase shift circuit 13. At the time where the rotation speed of the motor 1 after being started approaches its steady speed, and phase pull-in is started, the phase relation (lead or lag) between the reference phase signal A on the input side and the rotation speed signal C on the output side is random. That is, depending on fluctuation of the motor starting timing, fluctuation of the load or fluctuation of the motor rotation, the phase relation becomes random as shown in FIGS. 7 and 8. Further, because this means that the target value in the phase system (the phase difference between the signals A and C) is large, and the value of the step input is also large, a long period of time is required for the phase pull-in as shown by the waveform of the phase error signal H in FIG. 9. In contrast, in the case of the phase relation shown in FIG. 5, the target value in the phase system is small, and the desired phase pull-in is completed within a short period of time. In this case, the waveform of the phase error signal H changes relative to time as shown in FIG. 10.

Figure 11:
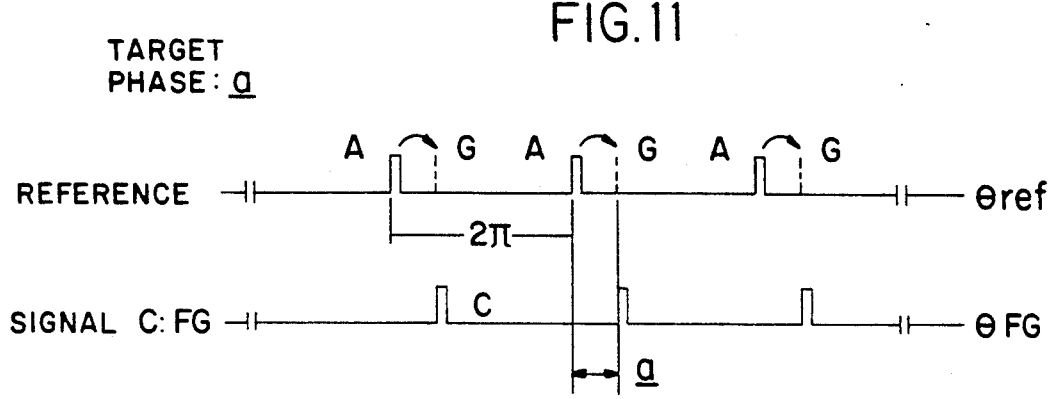
Figure 12:
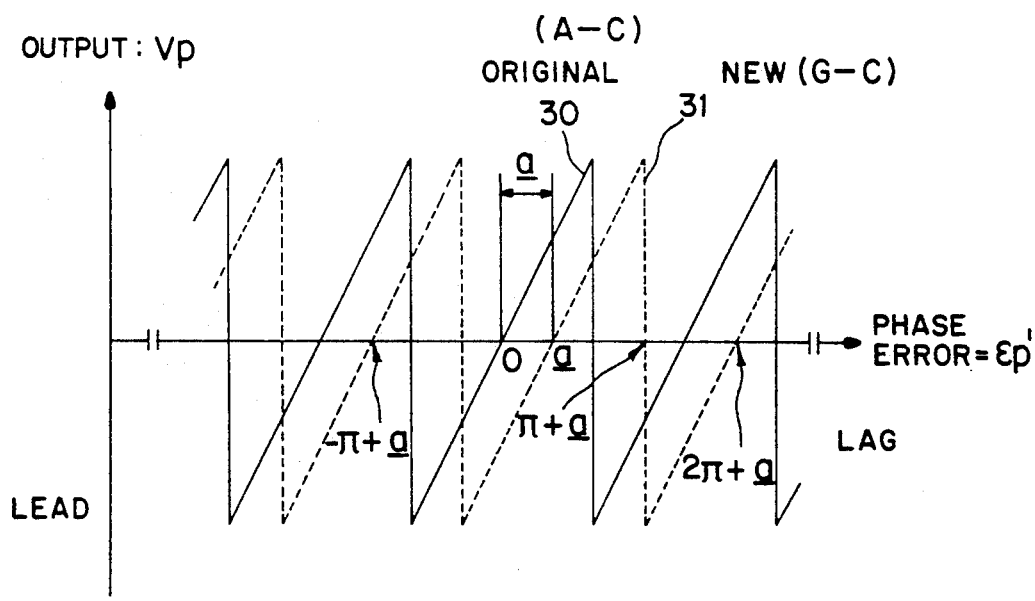

The circuits 12 and 13 are provided so as to avoid fluctuation of the phase pull-in time due to such a random phase relation between the input phase A and the output phase C. By the provision of these circuits 12 and 13, the phase comparison characteristic can be improved as shown in FIGS. 11 and 12. This improvement will now be described in detail.

The basic operation of the system of the present invention in the motor starting stage will be described.

As soon as the switch 21 is turned on to instruct starting of the motor 1, the system control circuit 8 applies its control signals to the circuits 9 to 14 and 16 so as to execute processing required for starting the motor 1.

Figure 13:
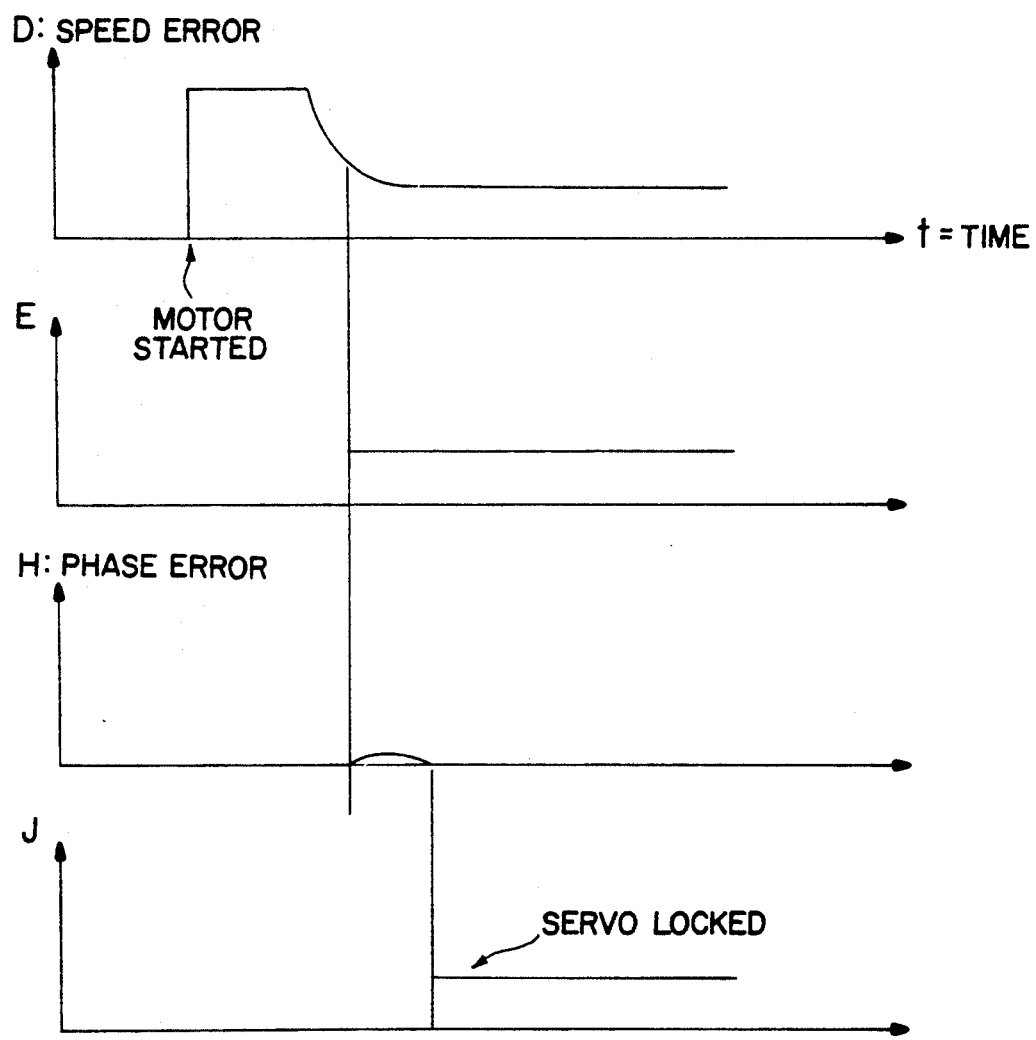

First, the rotation speed error detection circuit 10 generates the speed error signal D having a waveform as shown in FIG. 13 when the motor 1 is driven. At the same time, because the motor 1 is in its starting stage, and its rotation speed is outside the steady speed range, the switch 20 selects the fixed bias signal I from the fixed bias circuit 15 according to the decision output signal E (FIG. 13) of the steady speed detection circuit 11. In order to prevent erroneous operation, reduction of memory contents and generation of an unnecessary output, the operation of the initial phase detection/memory circuit 12 is inhibited under control of the system control circuit 8. Also, the phase comparing operation of the rotation phase error detection circuit 14 is inhibited under control of the system control circuit 8, and the phase error output signal H is in its zero level as shown in FIG. 13.

When the rotation speed of the motor 1 increases to a level close to the steady speed, and the steady speed detection circuit 11 detects that the motor rotation speed is now within the steady speed range, the switch 20 selects the output signal H of the circuit 14, and the operation of the initial phase detection/memory circuit 12 is permitted under control of the system control circuit 8.

On the basis of the first reference phase signal A, the initial phase detection/memory circuit 12 measures and stores the phase difference (the time difference) between the motor rotation speed signal C and the first reference phase signal A, and its output signal F indicative of the initial phase difference is applied to the reference phase shift circuit 13.

In the reference phase shift circuit 13, the phase of the first reference phase signal A is delayed by an amount corresponding to the initial phase difference F (the phase difference a between the signals A and C in FIG. 11), thereby newly producing a second reference phase signal G which is applied to the rotation phase error detection circuit 14.

At the same time, this detection circuit 14 operates under control of the system control circuit 8 so as to start detection of the phase error. As a result, the initial A-C characteristic 30 is offset by the amount of the initial phase difference a, so as to provide a new G-C characteristic 31 as shown in FIG. 12. In the phase comparison characteristic shown in FIG. 12, the phase difference $\epsilon_p'$ is now expressed as $$\epsilon_p' = \theta_{FG} - \theta_{yef} - a \text{ (radian)}$$

where $\theta_{yef}$ represents the reference phase, and $\theta_{FG}$ represents the motor rotation phase.

The switch 20 selects now the rotation phase error signal H in lieu of the fixed bias signal I, and the phase control in the motor control servo system is started. Thus, the phase difference between the second reference phase signal G and the motor rotation FG signal C becomes zero. Then, when the phase difference comes with the steady phase difference range, the steady phase detection circuit 16 applies to the system control circuit 8 its output signal J indicative of completion of the phase pull-in, that is, servo locking.

In response to the application of this servo lock signal J, the SSG in the image pickup unit 6 is reset by the output signal of the PG 4 under control of the system control circuit 8, so that the predetermined phase difference is now established between the rotation phase of the magnetic disk 2 and the phase of the image signal.

Figure 14:
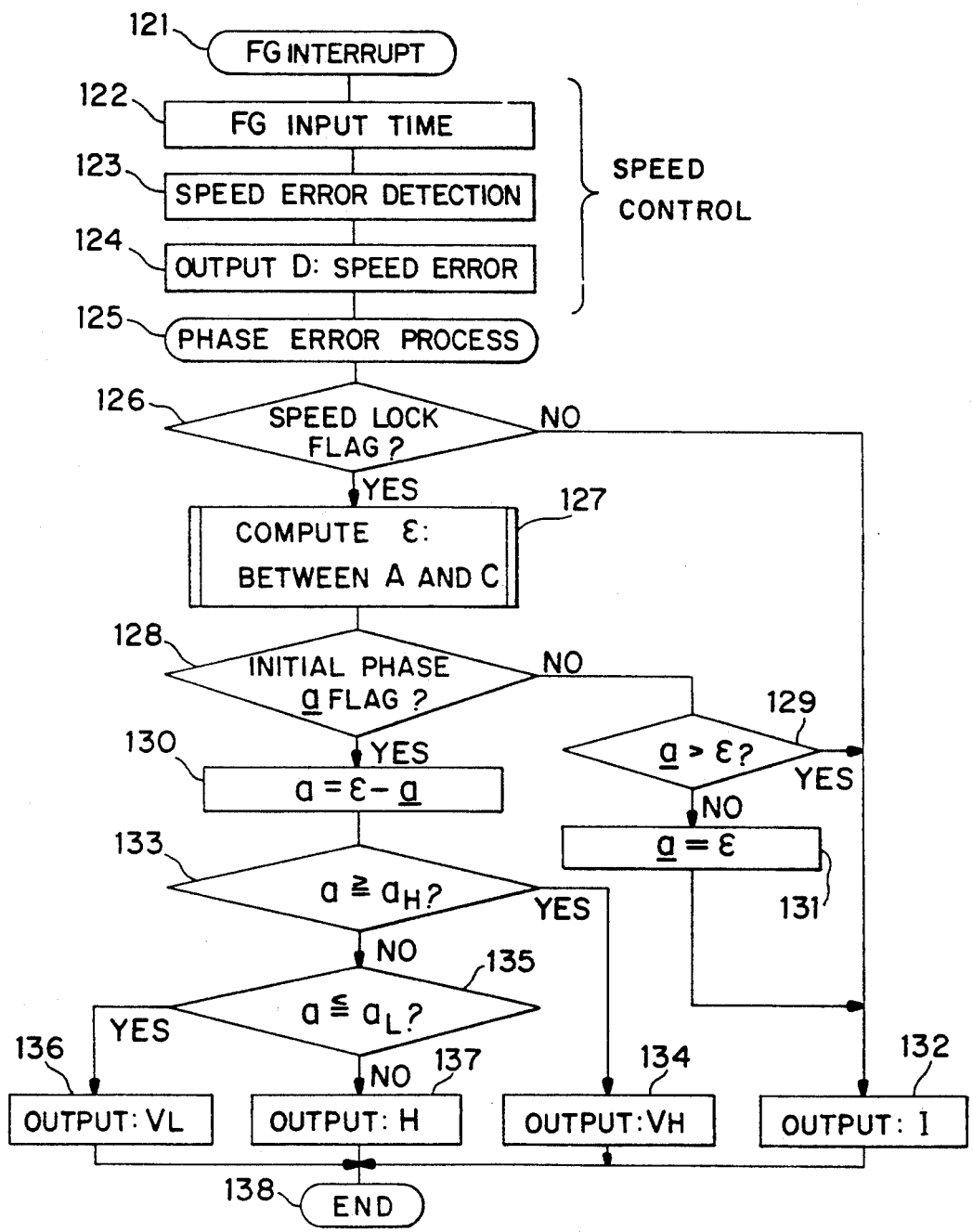
FIG. 14 is a flow chart of the sequence control by the microprocessor.

FIG. 14 is a flow chart of the operation of the microprocessor 100 according to software.

FIG. 14, steps 121 to 124 show the sequence of processing in the speed system. In the step 121, the speed system operates in response to the motor speed FG signal C applied as an interrupt signal. In the step 122, the input time of the motor rotation FG signal C is recorded. Then, in the speed error detection step 123, the motor rotation speed in computed on the basis of the result of periodic arithmetic and logical processing on the FG signal C, and the reference speed B is subtracted from the computed motor rotation speed so as to compute the speed error D. In the step 124, the speed error D obtained by the arithmetic processing in the step 123 is delivered as the output.

The step 124 is followed by a phase-error processing step 125 from which arithmetic and logical processing in the motor control servo system is executed in steps 126 to 138.

In the step 126, decision is made as to whether or not the motor speed system is locked. When the result of decision in the step 126 proves that the output signal E of the steady speed detection circuit 11 indicates that the motor rotation speed is not close to the steady speed, the speed lock flag is cleared. Then, the step 126 is followed by the step 132 in which the phase error is set at zero, and the center-fixed bias voltage I is used as the phase error output signal.

On the other hand, when the result of decision in the step 126 proves that the motor rotation speed is close to the steady speed, the step 126 is followed by the step 127 in which the phase error $\epsilon$ between the first reference phase signal A and the motor rotation FG signal C is computed.

Then, in the step 128, decision is made as to whether or not the initial phase flag is set. When the initial phase flag is set as a result of the decision, the step 128 is followed by the step 130. Alternatively, when the initial phase flag is not set, the step 128 is followed by the step 129.

In the step 129, the initial phase flag is set, and the phase difference $\epsilon$ computed in the step 127 is compared with the minimum amount a of the offset of the initial phase of the phase shift. When the value of a is larger than that of $\epsilon$, the step 129 is followed by the step 132; Alternatively, when the value of a is smaller than that of $\epsilon$, the relation $a = \epsilon$ is set in the step 131 which is followed by the step 132.

In the phase error detection step 130, the offset amount a (G) of the phase shift is subtracted from the aforementioned phase difference $\epsilon$ so as to compute the phase error $\alpha$.

In the steps 133 and 134, the phase error $\alpha$ is limited. That is, in the step 133, the phase error $\alpha$ is compared with a pre-set phase difference $\alpha_H$. When the value of $\alpha$ is larger than or equal to that of $\alpha_H$, an excessive phase lag has occurred, and the step 133 is followed by the step 134 in which a phase error voltage $V_H$ is generated. On the other hand, in the step 135, the phase error $\alpha$ is compared with a pre-set difference $\alpha_L$. When the value of $\alpha$ is smaller than or equal to that of $\alpha_L$, an excessive phase lead has occurred, and the step 135 is followed by the step 136 in which a phase error voltage $V_L$ is generated.

When the phase error $\alpha$ satisfies the relation $\alpha_L < a < \alpha_H$, the phase error signal H corresponding to the phase error $\alpha$ is generated from the rotation phase error detection circuit 14 in the step 137, and the processing on the phase system ends in the step 138.

Figure 15:
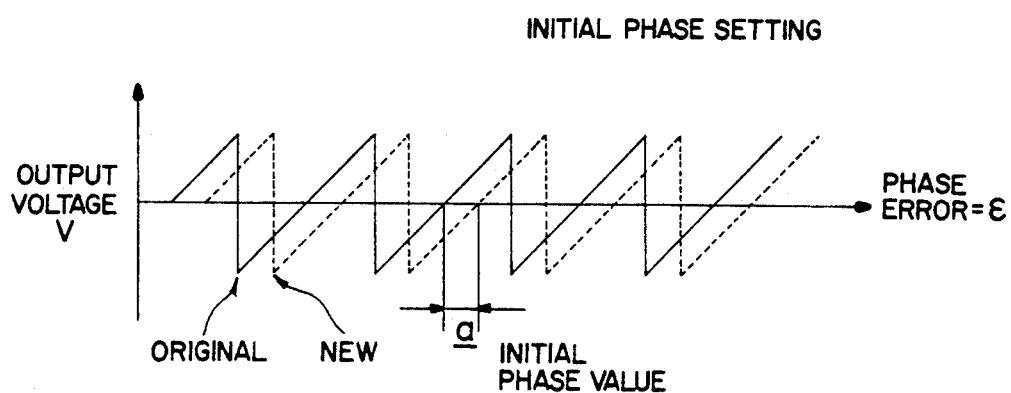
FIGS. 15 and 16 are timing charts for the initial phase setting and the later phase control respectively.
Figure 16:
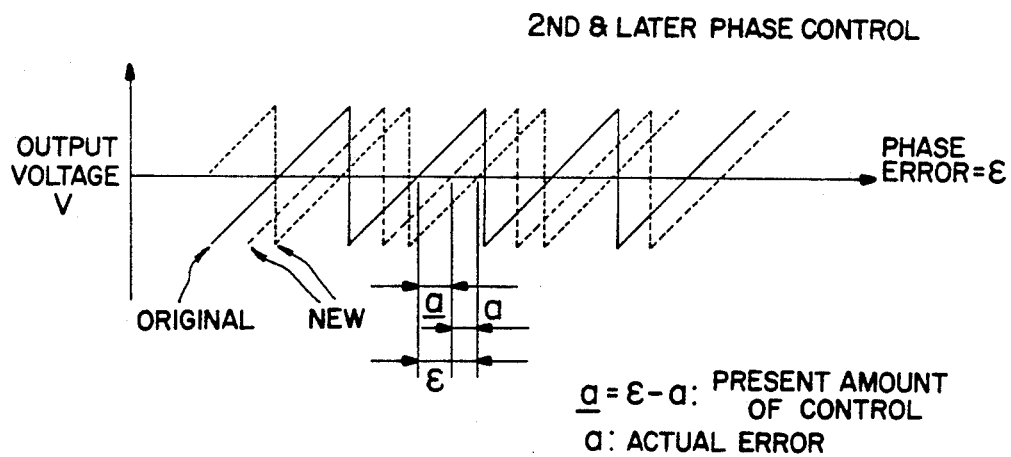

FIG. 15 shows the phase difference VS voltage characteristic at the timing of setting the initial phase, and FIG. 16 shows the phase difference VS voltage characteristic at the second and succeeding timings of setting the phase.

The minimum amount a of the offset of the initial phase by the phase shift referred to in the step 129 is set at a value greater than that of the time which may be requires in view of various factors of fluctuation attributable to the processing starting from the step 121 and ending in the step 138.

An adverse effect due to the interrupt timing can be minimized when the phase difference $\alpha$ is compared with the minimum amount a of the phase offset, and this minimum amount a of the phase offset is employed as the initial phase when there is the relation $\epsilon < a$ as described above.

While the above description refers to an application of the present invention to an electronic still camera, it is apparent that the present invention is also applicable to various other controls such as phase control of a capstan of a VTR.

According to the present invention, an initial phase difference between a first reference phase and a rotation output phase of a motor is provided by an offset of the first reference phase at the time of starting the operation for controlling the motor rotation phase in the vicinity of the steady speed range of the motor. Therefore, a target input in a first phase control loop can be set at a small value, and servo locking can be quickly achieved within a short period of time without fluctuation that may be encountered each time the motor is started. The same effect can also be exhibited even when a speed deviation occurs due to impartation of great disturbance or when the target speed is subject to a variation.

In other words, in order that a reference phase which is the target phase of the motor phase system becomes the same as the motor rotation output phase at the time where the motor speed system reaches a speed level close to the steady rotation speed, and the phase pull-in is about to take place, a new reference phase is set according to the present invention. Therefore, because the target setting is always constant, and its value itself also become small, the phase pull-in (the servo locking) can be achieved within a short period of time, and the pull-in time would not fluctuate each time the motor is started.

We claim:

1. In a system having a motor and a signal generator developing a motor speed signal having a frequency proportional to motor speed, a motor control servo system for quickly driving the motor into speed lock at a desired motor speed by locking onto a phase reference signal comprising:

drive means for driving said motor, said drive means quickly driving said motor to a speed substantially equal to said desired motor speed;

means, responsive to said phase reference signal and said motor speed signal for determining the initial phase difference between the phase reference signal and the phase of said motor speed signal to produce an initial phase difference signal;

means for shifting the phase of said phase reference signal by said initial phase difference to form a phase shifted reference signal;

means for determining the phase error between said phase shifted reference signal and the phase of said motor speed signal;

said drive means being responsive to the phase error determined by said means for determining to adjust the speed of said motor to lock said motor speed signal in phase with said phase shifted reference signal.

2. The system of claim 1 wherein said means for shifting reduces the phase difference which must be corrected to acquire servo lock, thereby reducing the time necessary to acquire servo locked speed control.

3. The motor servo system of claim 1 further comprising means for comparing the frequency of said motor speed signal to a speed reference signal defining the speed at which phase lock may occur and producing a speed difference signal representative thereof;

said drive means being responsive to said speed difference signal for driving said motor to the speed substantially equal to said desired motor speed at a maximum acceleration rate;

4. In a system having a motor and a signal generator developing a motor speed signal having a frequency proportional to motor speed, a method of quickly driving the motor into speed lock at a desired motor speed by locking onto a phase reference signal comprising:

(a) quickly driving said motor to a speed substantially equal to said desired motor speed;

(b) determining the initial phase difference between the phase reference signal and the phase of said motor speed signal to produce an initial phase difference signal;

(c) shifting the phase of said phase reference signal by said initial phase difference to form a phase shifted reference signal;

(d) determining the phase error between said phase shifted reference signal and the phase of said motor speed signal;

(e) adjusting the speed of said motor in response to said phase error signal to lock said motor in phase with said phase shifted reference signal.

5. The method of claim 4 wherein said step (c) of shifting reduces the phase difference which must be corrected to acquire servo lock, thereby reducing the time necessary to acquire servo locked speed control.

6. The method of claim 4 further comprising:
(f) comparing the frequency of said motor speed signal to a speed reference signal defining the speed at which phase lock may occur and producing a speed difference signal representative thereof;

said step (a) driving said motor to the speed substantially equal to said desired motor speed at a maximum acceleration rate.

* * * * *